Figure 1:
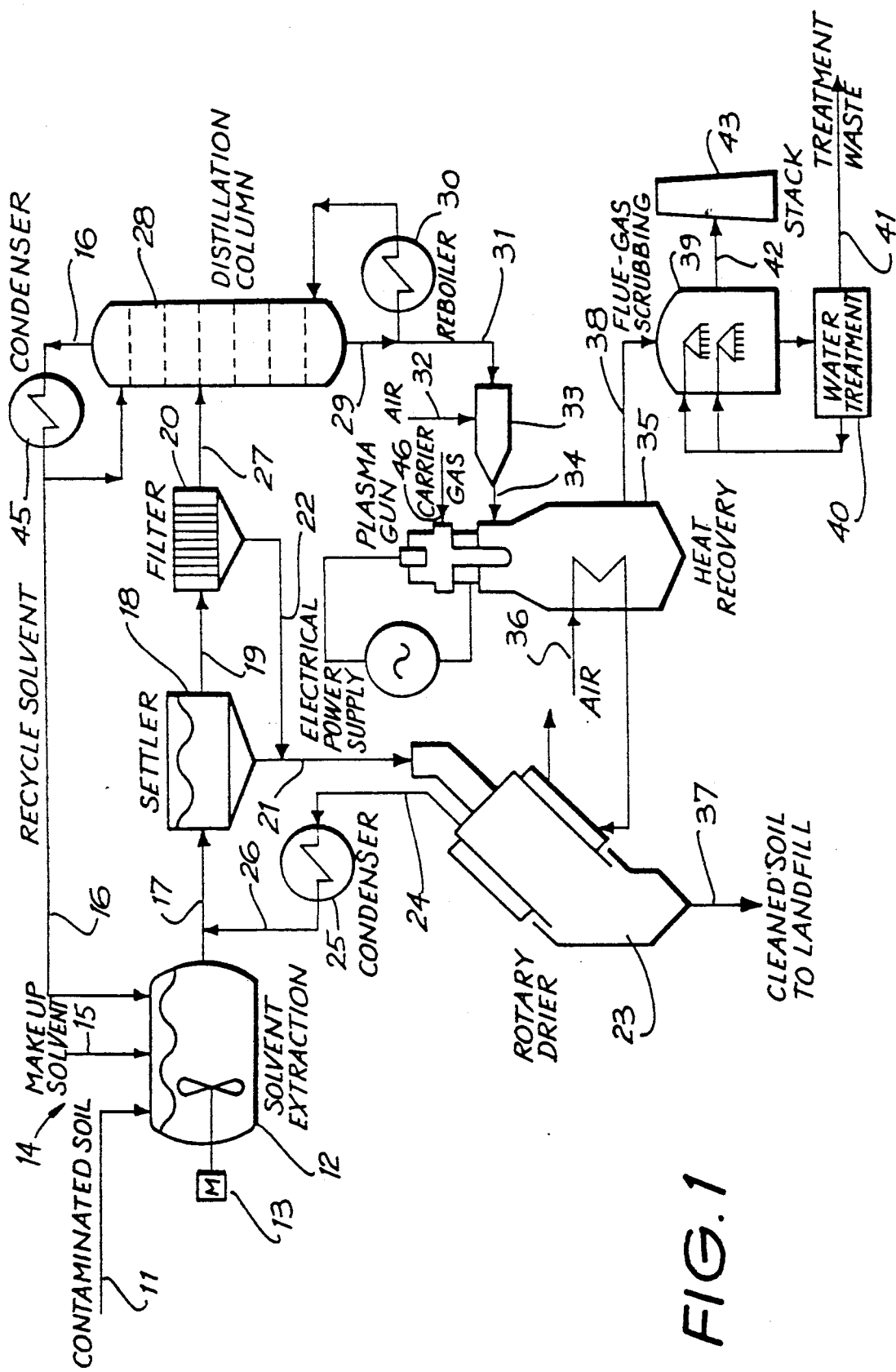

United States Patent [19]

Robertson

[11] Patent Number: 5,078,868

[45] Date of Patent: Jan. 7, 1992

[54] APPARATUS FOR THE RECOVERY AND DESTRUCTION OF TOXINS FROM CONTAMINATED SOILS

[75] Inventor: Struan Robertson, Broadbeach, Australia

[73] Assignee: Zenata N.V., Netherlands Antilles

[21] Appl. No.: 508,239

[22] Filed: Apr. 11, 1990

[51] Int. Cl.$^5$ .................................................. F23G 7/14
[52] U.S. Cl. .................................... 210/175; 210/188; 210/348; 210/513; 210/909; 210/911; 110/221; 110/224; 110/236; 110/238; 110/241
[58] Field of Search ............... 210/710, 773, 766, 805, 210/348, 908, 909, 911, 651, 634, 901, 175, 188, 513; 110/344, 236, 238, 346, 221, 224, 241; 134/25.1, 26, 42

[56] References Cited

U.S. PATENT DOCUMENTS

| | | | |
|---|---|---|---|
| 4,509,434 | 4/1985 | Boday et al. | 110/346 |
| 4,715,965 | 12/1987 | Sigenson et al. | 134/25.1 |
| 4,765,257 | 8/1988 | Abrishamian et al. | 110/346 |
| 4,770,109 | 9/1988 | Schlienger | 110/346 |

Primary Examiner—Robert A. Dawson
Assistant Examiner—David Reitsnyder
Attorney, Agent, or Firm—Lee, Mann, Smith, McWilliams & Sweeney

[57] ABSTRACT

A method and apparatus for cleansing contaminated soil (11), the apparatus includes an extraction vessel (12) into which contaminated soil (11) is delivered together with a solvent. A slurry is produced which is delivered to a settler (18) which produces a settler underflow and contaminated solvent. The settler (18) underflow is delivered to a drier (23). The contaminated solvent passes through a filter (20) which produces a filter cake also delivered to the drier (23). The contaminated solvent passes through a distillation column (28) and is subsequently delivered to a plasma gun (35) whereat the contaminants are oxidized.

3 Claims, 1 Drawing Sheet

APPARATUS FOR THE RECOVERY AND DESTRUCTION OF TOXINS FROM CONTAMINATED SOILS

The present invention pertains to a method and apparatus for cleansing contaminated soil and more particularly to the extraction of toxic material from soil using solvents.

Soils contaminated with toxic contaminants pose a significant health risk.

It is an object of the present invention to extract toxics from soil in a concentrated form that facilitates destruction of the toxic residue and whereby chemical modification to the cleansed soil is minimal.

Accordingly, the benefits of the present invention are obtained by contacting a contaminated soil with a solvent, forming a slurry which is transferred to a settler, filtering and clarifying the solvent drawn off the slurry, drying the decontaminated settler underflow and filter cake, vaporizing the residual solvent in the decontaminated soil, recondensing and recycling the residual vaporized solvent, distilling the filtered solvent containing extracted toxins to produce a purified recycle solvent and a bottom fraction containing concentrated toxics, and injecting the bottom fraction into a plasma jet.

FIG. 1 shows a schematic diagram of the soil cleansing method and apparatus of the present invention.

As shown in FIG. 1, contaminated soils 11 are introduced into an extraction vessel 12 equipped with a motorized stirrer 13 or other means of agitation. The vessel also receives a solvent 14 which is adapted to dissolve the toxic present in the soil. Known toxics include but are not limited to Polycholorinated biphenols (PCB), dichloro benzene (DCB), Polychlorinated dibenzodioxin (PCDD), polychlorinated dibenzo furan (PCDF), DICLORIN, ALDRIN, PARATHION and MALATHION. The introduced solvent includes make-up or fresh solvent 15 and may also include recycled solvent 16 which is generated downstream in the process as will be explained. The extraction vessel 12 produces a slurry 17 which is brought to a settler 18. The settling process produces a clarified solvent 19 which is drawn off and filtered 20. Settler underflow 21 and filter cake 22 are transferred to an indirectly heated rotary drier 23. The drier product is cleansed soil.

Residual solvent in the decontaminated soil is vaporized in the drier. The vapor 24 passes through a condenser 25. The condensed vapor 26 is reintroduced into the settler.

Filtered solvent 27 containing the extracted toxics is fed into a distillation column 28 including a condenser 45 to produce the purified recycle solvent 16 for the extraction vessel 12. The column 28 also produces a bottom fraction 29 in which the toxics are concentrated.

Some solvent may be recuperated from the bottom fraction 29 by passing it through a reboiler 30, the output of which feeds the column 28.

This concentrated remainder of the bottom fraction 31 including waste solvent and toxins is brought together with air 32 in an injector 33. The mixture 34 is injected with a carrier gas 46 into a plasma gun 35. A high temperature plasma jet within the gun 35 destroys the toxics and combusts the associated solvent.

An example of a suitable plasma gun is described in Australian Patent Application No. 80053/87, lodged originally on 22 Oct. 1986. In general, such a gun includes a pair of electrodes between which there is produced an electrical arc reaching temperatures of 12000° F. -16000° F. The toxic mixture is brought into proximity of the arc. One way of accomplishing this is to provide that one of the aforesaid electrodes includes a central conduit or passageway. Toxic material is fed through the central conduit and is emitted at the electrode gap. The oxidation products of such a gun may be fed into a second pair of electrodes (as disclosed in the aforementioned Australian Patent Application) for further disintegration, if required.

Sufficient heat can be recovered from the combustion occurring in the plasma gun 35 to heat air 36 which can be used in the rotary drier 23.

Combustion gases 38 from the gun 35 are passed through a flue-gas scrubber 39 including a water treatment apparatus 40. The products of the scrubber 39 are waste water 41 and scrubbed gas 42. The scrubbed gas is passed to the stack 43.

There are significant benefits of this solvent extraction method. A single solvent 15 is used in the extraction/toxics concentration route. Toxics are concentrated into a relatively low volume of destructor feed 31. Further, low temperature processing 23 does not chemically modify the soils, thus minimizing problems for disposal of cleaned residues. In addition, high destruction temperatures and high combustion efficiencies are obtained with plasma gun destruction 35.

What is claimed is:

1. An apparatus for cleansing condensed soil, said apparatus comprising:

a vessel to receive contaminated soil, and to mix the soil with a solvent to form a slurry;

a settler connected to the vessel, to receive said slurry therefrom, to remove cleansed soil from the slurry, and to provide a clarified solvent;

a filter means connected to said settler to receive said clarified solvent and to produce a filter cake and contaminated solvent;

a drier connected to said settler and filter means to receive said cleansed soil and said filter cake;

vapor collection means to receive vaporized solvent from said dryer;

a condenser connected to said vapor collection means to condense the vaporized solvent to be returned to the settler;

a distillation column connected to said filter to receive contaminated solvent therefrom and to distill said solvent to separate said solvent into recyclable solvent and contaminated solvent; and a plasma gun connected to said distillation column so as to receive said contaminated solvent, to be treated by the plasma gun.

2. The apparatus of claim 1, further including a flue-gas scrubbing means connected to said plasma gun to treat gases produced thereby so as to produce waste water and a scrubbed gas.

3. The apparatus of claim 2, further including a reboiler to receive at least part of the contaminated solvent from said distillation column to extract at least part of the solvent which is returned to the distillation column.

* * * * *